United States Patent
Hobdy

Patent Number: 5,860,382
Date of Patent: Jan. 19, 1999

[54] TURRET BEARING STRUCTURE FOR VESSELS

[76] Inventor: Miles A. Hobdy, 7434 Carew, Houston, Tex. 77074

[21] Appl. No.: 956,272

[22] Filed: Oct. 22, 1997

Related U.S. Application Data

[60] Provisional application No. 60/033,669 Dec. 18, 1996.

[51] Int. Cl.$^6$ .................................................. B63B 21/50
[52] U.S. Cl. .............................................. 114/230
[58] Field of Search ..................... 114/293, 230, 114/220; 441/3–5; 384/218, 220, 221, 581, 582, 119, 193, 200; 405/213; 267/414.1

[56] References Cited

U.S. PATENT DOCUMENTS

| | | |
|---|---|---|
| 3,084,517 | 4/1963 | Bell . |
| 3,086,765 | 4/1963 | Zanow . |
| 3,490,817 | 1/1970 | Dandl . |
| 4,876,978 | 10/1989 | O'Nion et al. . |
| 4,955,310 | 9/1990 | Pollack . |
| 4,995,598 | 2/1991 | Ingham . |
| 5,240,446 | 8/1993 | Boatman et al. . |
| 5,359,957 | 11/1994 | Askestad . |
| 5,515,804 | 5/1996 | Pollack . |
| 5,746,148 | 5/1998 | Delago .................................. 114/230 |

FOREIGN PATENT DOCUMENTS

| | | |
|---|---|---|
| 61-275086 | 5/1986 | Japan . |
| 61-150889 | 7/1986 | Japan ...................................... 114/293 |
| PCT/EP95/ 00934 | 5/1995 | WIPO . |

*Primary Examiner*—Sherman Basinger

[57] ABSTRACT

A radial bearing structure for radially supporting a turret (14) rotatably carried by a vessel (10) including a plurality of arcuately spaced radial bearing assemblies (74) for radially supporting a rail (38) about the circumference of the turret (14). Each radial bearing assembly (74) has a roller (104) and a follower (94). A pair of concentric spring assemblies (92, 98) continuously urge follower (94) and roller (104) toward rail (38) so that roller (104) remains in contact with the rail (38) at all times. As shown in FIG. 7, inner springs (92) have reached maximum radial travel toward rail (38) and do not exert a radial force against follower (94) and roller (104). During maximum lateral movements of the turret (14), outer coil spring (98) forces follower (94) and roller (104) a distance (D) relative to and beyond inner springs (92) to maintain a spring loading against roller (104) for maintaining contact of roller (104) against rail (38). As shown in FIG. 8, the inner spring assembly may comprise an elastomer spring (92A) having a plurality of elastomeric pads (93A) separated by metal discs (95A).

16 Claims, 5 Drawing Sheets

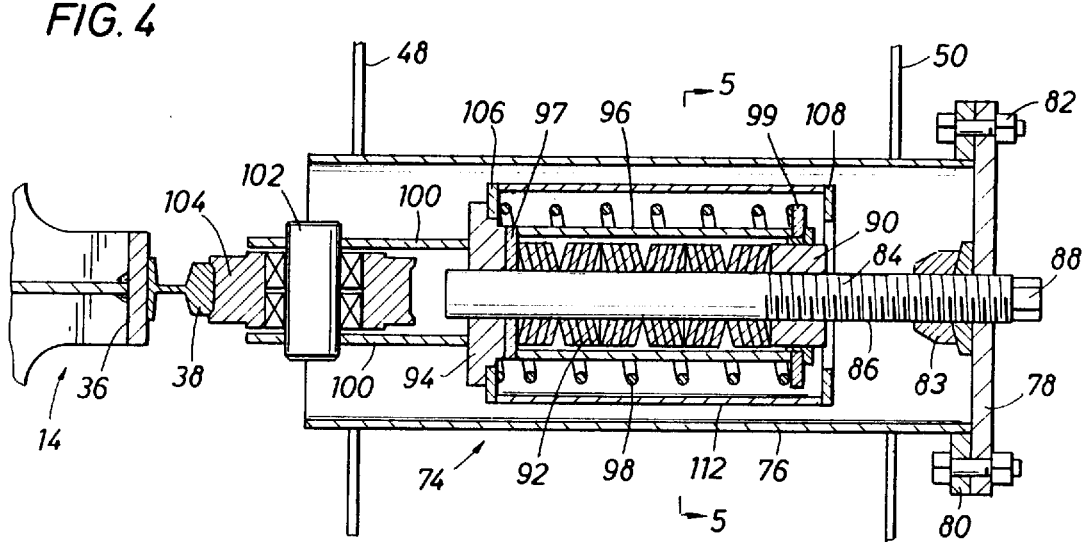
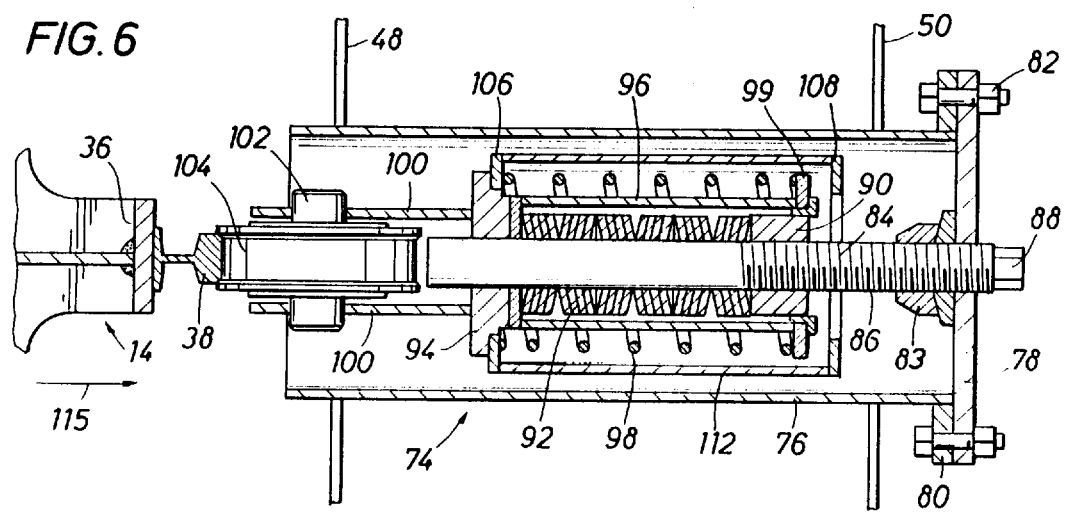
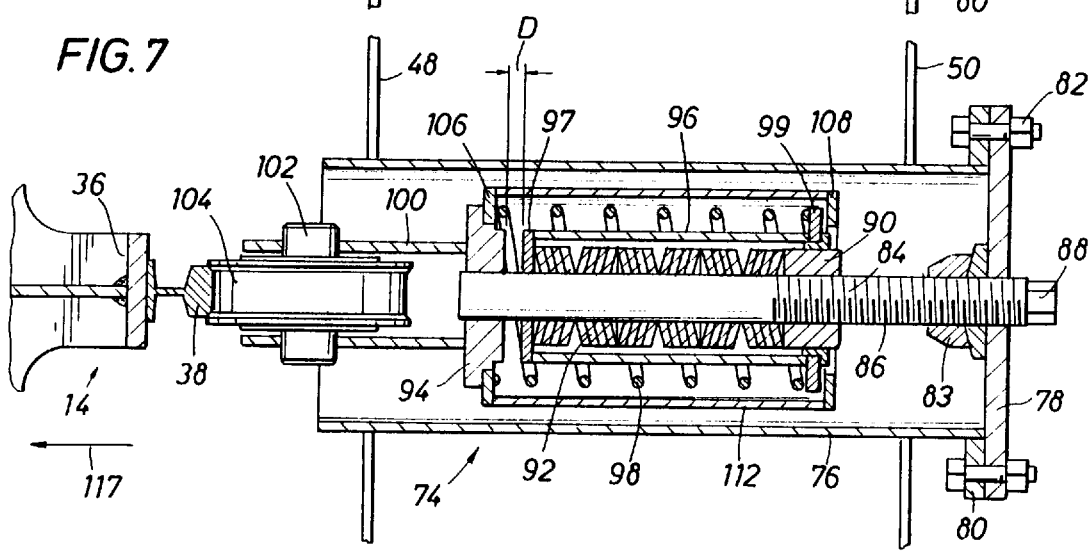

TURRET BEARING STRUCTURE FOR VESSELS

REFERENCE TO RELATED PROVISIONAL APPLICATION

This application claims the benefit of Provisional application Ser. No. 60/033,669 filed Dec. 18, 1996.

FIELD OF THE INVENTION

This invention relates to a turret bearing structure for vessels such as offshore drilling or production vessels, and more particularly to such a turret bearing structure having radial bearings for reacting horizontal loads between the turret structure and the vessel.

BACKGROUND OF THE INVENTION

Heretofore, vessel mooring systems have been provided in which a vessel may weathervane about a turret which is normally anchored to the sea floor. The turret is supported for rotation on bearing structures secured to the vessel. Both horizontal and vertical loads are transferred between the turret and the fixed structure of the vessel. Vertical and radial bearing structures have been provided heretofore for transferring the horizontal and vertical loads between the turret and the vessel. For example, U.S. Pat. No. 5,240,446 dated Aug. 31, 1993, shows a mooring system which includes a rotatable turret mounted on the vessel. The turret is supported in a well of the vessel and has a radial bearing structure or assembly. A plurality of radial bearing assemblies are spaced about the outer periphery of the turret and have bearing blocks engaging a support ring about the outer periphery of the turret. The bearing blocks may pivot to fit any uneven adjacent surfaces of the turret.

U.S. Pat. No. 5,359,957 dated Nov. 1, 1994 likewise discloses a turret for a vessel with the turret having fixed radial arms which are supported by both radial and axial bearings. The radial bearings includes rollers or wheels which run against a rail fixed to the vessel. A wedge device moves the rollers in and out in a radial direction. The rollers are mounted in very close relation to each other to limit flexure in the rail section.

Radial bearings react horizontal loadings from the turret structure to the ship structure. Radial flexures and radial deformations must be compensated by the radial bearings. Such radial bearings heretofore have also included Belleville type springs to compensate for radial flexures or deformations in radial bearings for turrets in which rollers on a turret side against a rail fixed to the structure of the vessel. The Belleville springs absorb a substantial horizontal loading with only a relatively small deflection required. However, a disadvantage in the utilization of Belleville springs occurs when a relatively large horizontal loading is being reacted from only one side of the turret with the rollers and rail on such one side in contact, while the rollers and rail on the opposite side of the turret are out of contact as a result of the relatively small travel or deflection provided by the Belleville springs. As a result, once the turret returns or travels back to its neutral center, the horizontal rail and rollers on the opposite side recontact each other but the rollers have to "climb" up the crown of the rail until the rail and rollers return to their original radially centered position. During return to the original radially centered position, the bearing system undergoes or experiences an increased rolling resistance which requires an increased torque in order for the vessel to weathervane about the turret. Thus, a need exists for a spring assembly to take up any slack occurring when a relatively large horizontal loading is being reacted from only one side of the turret which may result in a spacing between the rollers and rail on the opposite side of the turret.

It is an object of the present invention to provide a spring urged radial bearing structure for a turret which remains in contact with the turret during maximum lateral excursions of the turret.

Another object of this invention is the provision of a spring structure for a radial bearing structure including a pair of spring device with one spring device being effective after the other spring device is ineffective thereby to maintain the radial bearing structure in contact with the turret during maximum lateral excursions of the turret.

SUMMARY OF THE INVENTION

The present invention is directed to a radial bearing arrangement for radially supporting a substantially vertically aligned cylindrical turret rotatably mounted within a vertical opening or well in the vessel. The radial bearing arrangement includes a rail secured to the outer circumference of the turret and a plurality of radial bearing assemblies mounted on the structure of the vessel and spaced at arcuate intervals about the outer circumference of the turret for engaging the rail.

Each radial bearing assembly includes a roller frame having a roller rotatably mounted thereon for bearing contact against the bearing rail on the turret. A pair of concentric spring assemblies continuously urge a follower against the roller frame in an inward radial direction for forcing the roller into riding contact with the turret rail. A fixed guide shaft is mounted within an outer cylindrical housing and concentric spring assemblies fit within the cylindrical housing about the shaft for contacting the follower which also fits about the guide shaft. The inner concentric spring assembly includes a plurality of Belleville disc springs fitting about the shaft and absorbing horizontal loads from the turret rail and contacting roller in an outward radial direction with a relatively small radial travel. The outer concentric spring assembly includes a coil compression spring contacting the follower and likewise absorbing horizontal radial loads from the turret rail and contacting roller with a relatively large radial travel. The outer coil compression spring is effective to maintain contact relation between the roller and turret rail even though the inward horizontal radial travel of the roller may be greater than the inward horizontal radial travel of the Belleville springs thereby rendering ineffective the Belleville springs. However, the radial travel of the outer coil compression spring is of an amount sufficient to maintain a relatively strong and continuous bias against the follower and roller at all times thereby preventing "untracking" of the rollers from the turret on the rail.

Other features and advantages of the invention will be apparent from the following specification and drawings.

BRIEF DESCRIPTION OF THE DRAWINGS

FIG. 4 is an enlarged longitudinal section of the radial bearing assembly shown in FIG. 2 with inner and outer concentric spring assemblies shown in a normal centered position of the turret;

FIG. 6 is an enlarged longitudinal section of the radial bearing assembly shown in FIG. 4 but showing the turret moved toward the bearing assembly with the horizontal loading of the turret being reacted by the inner and outer concentric spring assemblies in a compressed retracted position of the concentric spring assemblies;

FIG. 7 is a longitudinal section of the assembly shown in FIGS. 4 and 6 but showing the turret moved away from the bearing assembly with the radial horizontal loading of the turret being reacted by an opposite side of the turret and the concentric spring assemblies shown in an extended position, the inner spring assembly not exerting a radial force against the turret.

DESCRIPTION OF THE INVENTION

Figure 1:
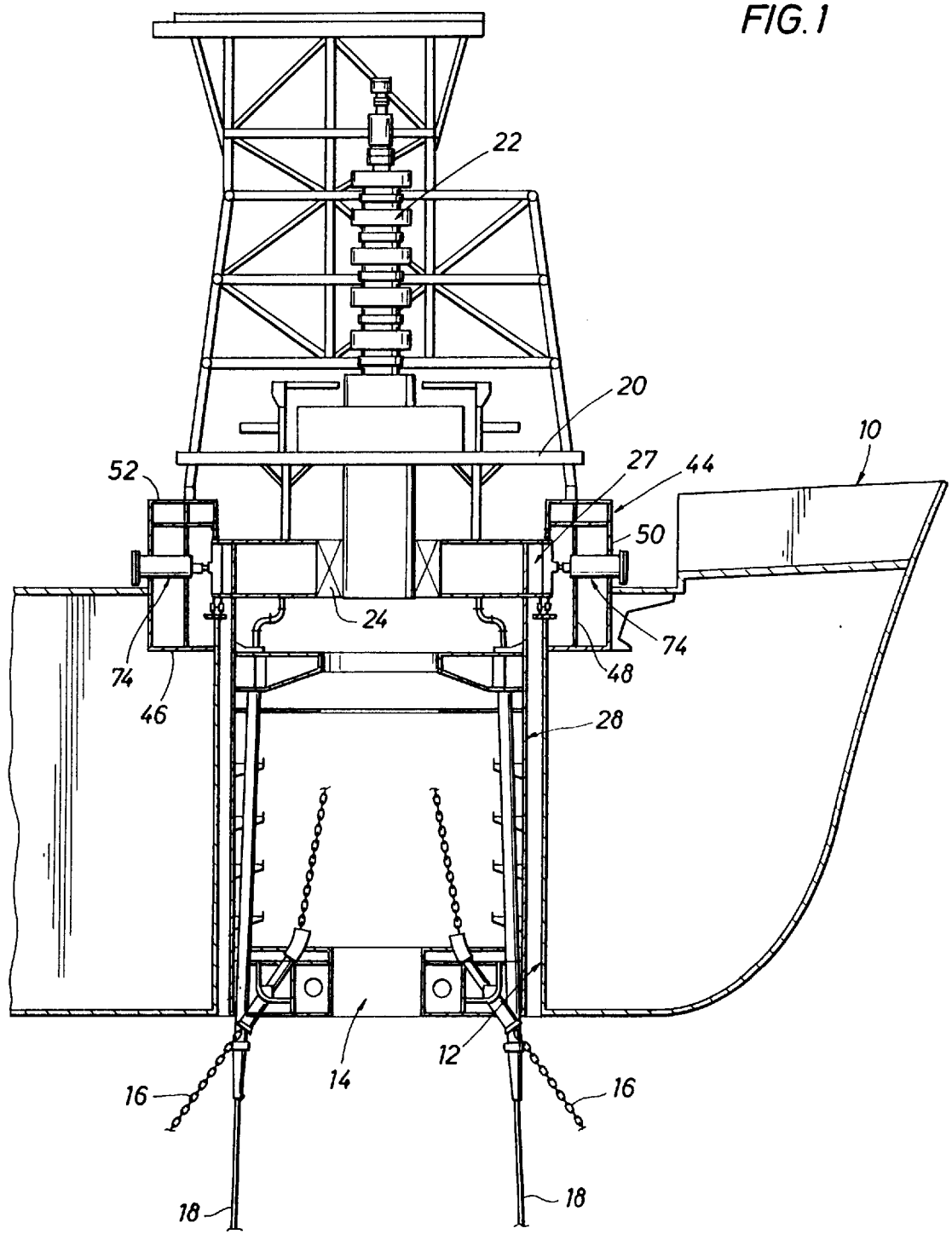
FIG. 1 is a longitudinal section of the bow of a vessel including a turret according to the present invention installed in a well in the bow.

Referring now to the drawings for a better understanding of this invention, and more particularly to FIG. 1, the bow of a vessel 10 is shown having a well or moon pool 12 extending through the hull of vessel 10. Mounted within well 12 is a turret generally indicated at 14 about which vessel 10 may weathervane. Well 12 is normally of a circular cross section and turret 14 is of a cylindrical shape to fit within well 12. Anchor legs 16 connected to turret 14 are secured to the sea bed by suitable anchors to restrict rotation of turret 14. Risers 18 extend to subsea wellheads or distribution facilities on the sea floor and are connected to turret 12. A manifold deck 20 is supported on the upper end of turret 14 and includes valves connected to risers 18 by flexible hoses. A swivel stack shown generally at 22 is secured to vessel 10 and extends upwardly from turret 14 and manifold deck 20. Swivel stack 22 is connected by bearing 24 to turret 14 and permits rotation or weathervaning of vessel 10 about turret 14 and risers 18.

Figure 2:
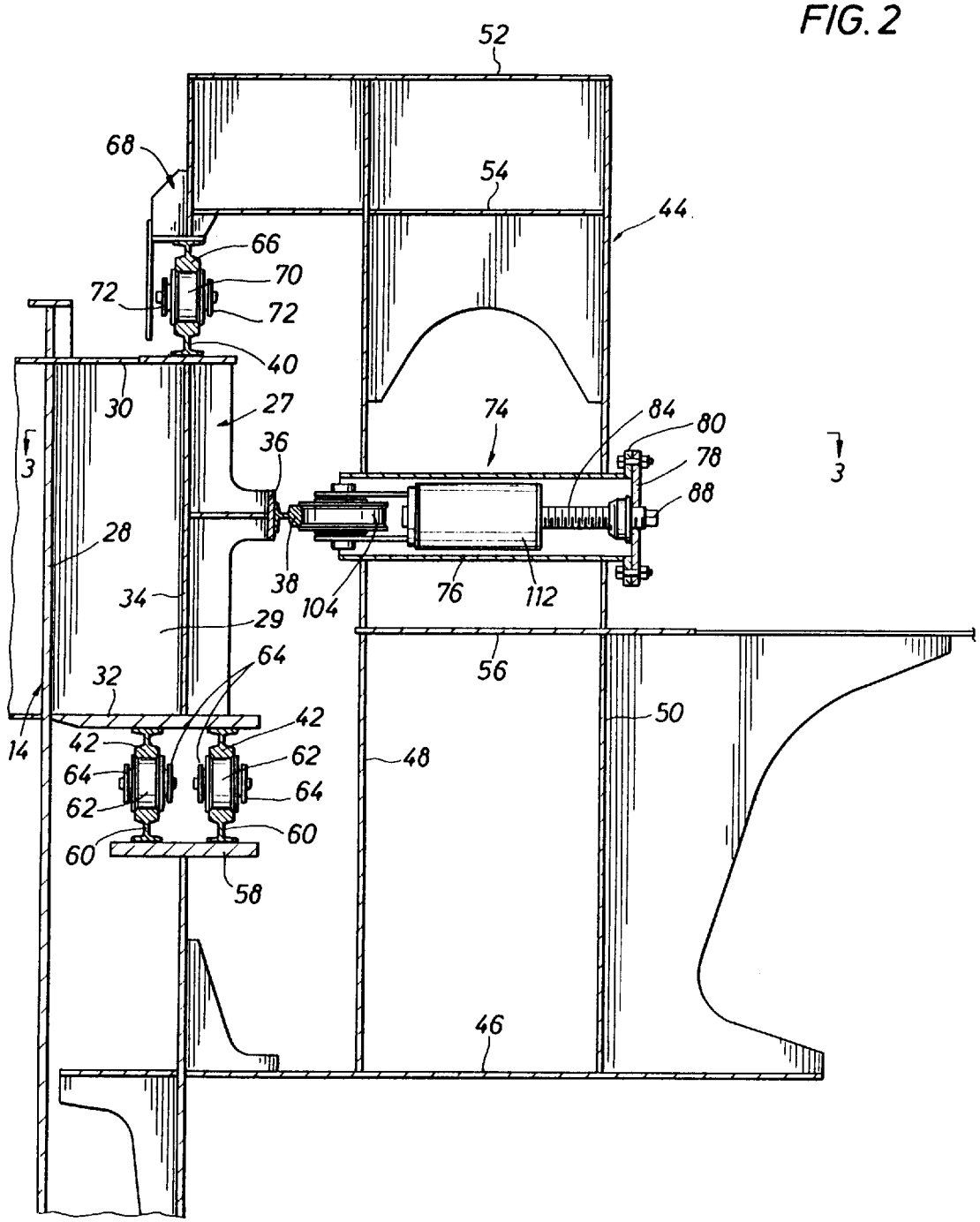
FIG. 2 is an enlarged fragment of FIG. 1 showing the bearing structure for the turret to permit weathervaning of the vessel about the turret and including both radial and vertical bearing assemblies.
Figure 3:
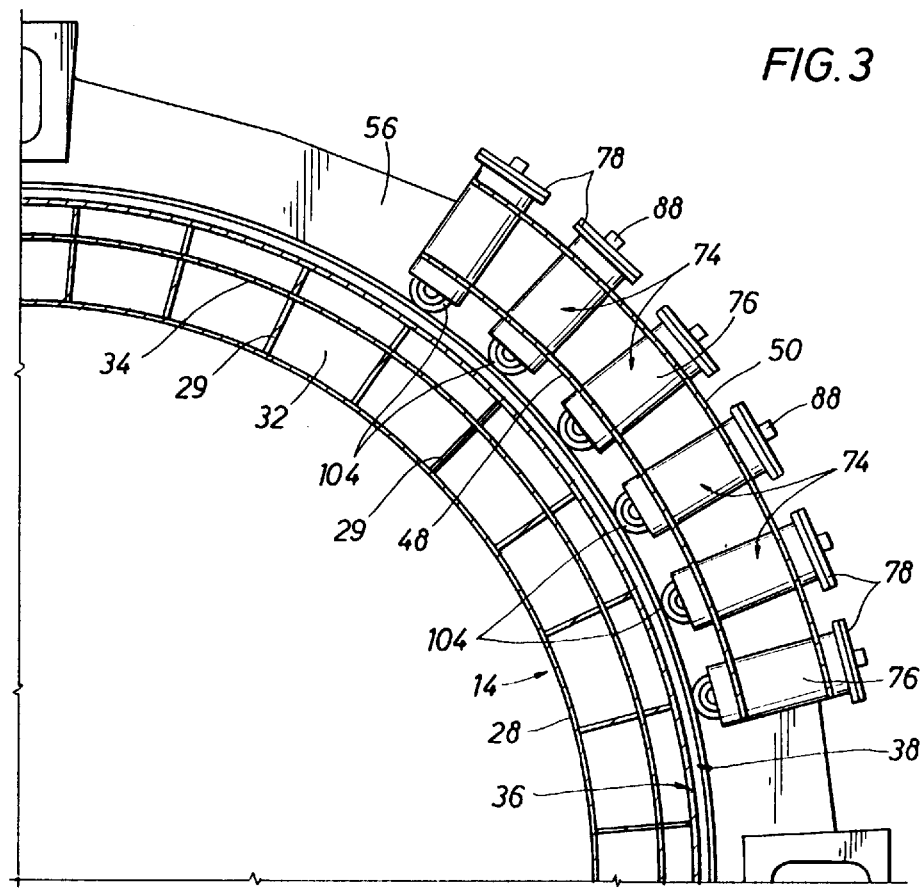
FIG. 3 is a plan of a radial bearing arrangement for reacting horizontal loads of the turret taken generally about 3—3 of FIG. 1 and including a plurality of radial bearing assemblies arcuately spaced about the outer circumference of the turret.
Figure 5:
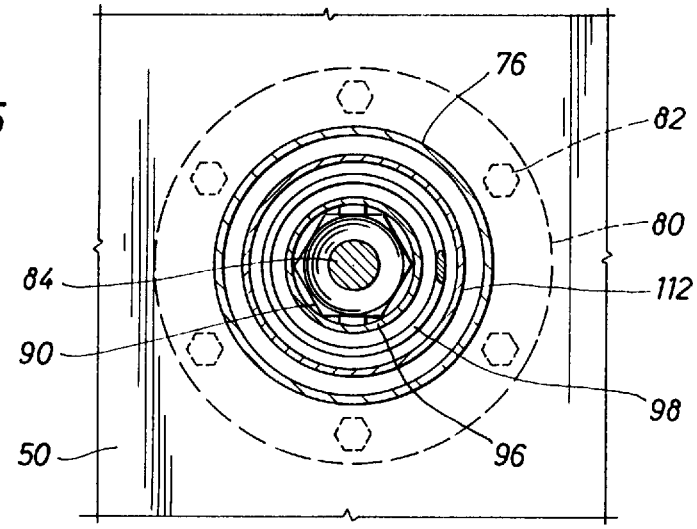
FIG. 5 is a cross sectional view taken generally along line 5—5 of FIG. 4.

As shown particularly in FIGS. 2 and 3, turret 14 includes a cylindrical body 28 having an upper radial extension or arm 27 including a pair of horizontal annular flanges or plates 30, 32 extending outwardly from cylindrical body 28. A vertical annular web 34 in concentric relation to body 28 reinforces annular flanges 30 and 32. Transverse reinforcing webs 29 are secured between cylindrical body 28 and annular web 34. Extending outwardly horizontally from web 34 is an annular T-shaped rail support 36. Mounted on rail support 36 is an annular rail 38 which extends about the outer circumference of rail support 36 to provide a radial bearing member about the outer periphery of turret 14 for horizontal loads exerted by turret 14.

Upper plate 30 has an upper rail 40 and lower plate 32 has a pair of lower rails 42 to provide bearing members on turret 14 for vertical loads exerted by turret 14. A turret support structure generally indicated at 44 is fixed to a depressed deck portion 46 of vessel 10 to permit weathervaning of vessel 10 about turret 14. A pair of concentric rings 48 and 50 extend upwardly vertically from deck portion 46. An upper annular cover plate 52 extends over concentric rings 48 and 50. Horizontal stiffeners 54 and 56 are secured between rings 48 and 50.

A T-section 58 extends upwardly from deck portion 46 and a pair of parallel lower rails 60 are secured thereto in spaced relation to opposed rails 42 on turret 14. A pair of rollers 62 are mounted between rails 42 and 60 for transferring vertical loads between rails 42 and 60 from turret 14 to vessel 10. Rollers 62 have shafts extending between plates 64. An upper rail 66 is secured by brackets 68 to stiffener 54 and extends downwardly therefrom in a vertically spaced relation to upper rail 40 on turret 14. Rollers 70 mounted between plates 72 are positioned between rails 40 and 66 and assist in maintaining turret 14 in axially aligned relation with well 12.

Radial Bearing Arrangement

Forming an important part of this invention is the radial bearing arrangement as shown generally in FIGS. 2 and 3. A plurality of radial bearing assemblies 74 are arcuately spaced about the outer periphery of turret 14 with each bearing assembly 74 extending in a radial direction and having an outer cylindrical housing 76 secured to rings 48 and 50. As shown further in FIGS. 4–7, an outer end cap 78 is removably secured to a mounting flange 80 on cylindrical housing 76 by suitable nut and bolt combinations 82.

An internally threaded block 83 is secured to end cap 78. A shaft 84 having external threads 86 is threaded within block 83 and may be adjusted longitudinally by a suitable tool engaging flats on end 88. An end nut 90 is threaded onto shaft 84. A follower 94 has an opening receiving shaft 84 and is mounted about shaft 84 for relative longitudinal movement. A pair of spaced arms 100 are secured to follower 94 and support a shaft 102 therebetween. A roller 104 is mounted for rotation on shaft 102 and is in engagement with rail 38 on turret 14. Follower 94 thus moves with roller 104.

An inner spring housing 96 has a front end plate 97 about shaft 84 and abutting follower 94 when turret 14 and rail 38 are in a centered position within well 12 as shown particularly in FIG. 4. The rear end flange 99 of inner spring housing 96 is mounted for sliding movement with housing 96 along end nut 90 threaded onto shaft 84. A plurality of Belleville washers or springs 92 are mounted about shaft 84 between nut 90 and end plate 97 of inner spring housing 96. An outer concentric spring housing 112 is secured to follower 94 by front end flange 106 for movement with follower 94. Housing 112 has a rear end flange 108. A coil compression spring 98 is mounted about inner spring housing 96 and is compressed between follower 94 and rear end flange 99 of inner spring housing 96.

Operation of Radial Bearing Arrangement

Referring to FIG. 4, turret 14 and rail 38 are shown in a centered position in which the horizontal loading is being reacted by rail 38 generally equally about the outer circumference of turret 14. In this position, follower 94 urges roller 104 into contact with rail 38 under a predetermined compression of Belleville springs 92 and coil spring 98. The compression of Belleville springs 92 may be adjusted as desired by rotation of shaft 84 and movement of nut 90.

Referring to FIG. 6, turret 14 and rail 38 are shown in a position in which unequal horizontal forces from an opposite side of turret 12 moves turret 12 and roller 104 in the direction of arrow 115. Corresponding movement of roller 104 and follower 94 compresses Belleville springs 92 against nut 90. Coil spring 98 remains under its predetermined compression of FIG. 4 as inner spring housing 96 moves with follower 94 in the direction of arrow 115.

Referring to FIG. 7, turret 14 and rail 38 are shown in a lateral position in which unequal horizontal forces from the side of the turret shown in FIG. 7 moves turret 14 and rail 38 in the direction of arrow 117 from the centered position shown in FIG. 4. In this position follower 94 is spaced a distance D from end plate 97 of inner spring housing 96 and Belleville springs 92 are in a non-compressed relation. In this position, Belleville springs 92 are not effective to maintain contact of roller 104 against rail 38 as the deflection of Belleville springs 92 is limited. However, coil spring 98 is effective to maintain a horizontal force against follower 94 sufficient to maintain contact between roller 104 and rail 38 under all conditions of operation. Coil spring 98 is sized to provide a predetermined loading effective to maintain a predetermined force against rail 38 for maximum lateral movement of excursions of turret 14 and rail 38. Thus, coil spring 98 is effective to take up any slack occurring when a relatively large horizontal loading is being reacted from only one side of the turret.

Figure 8:
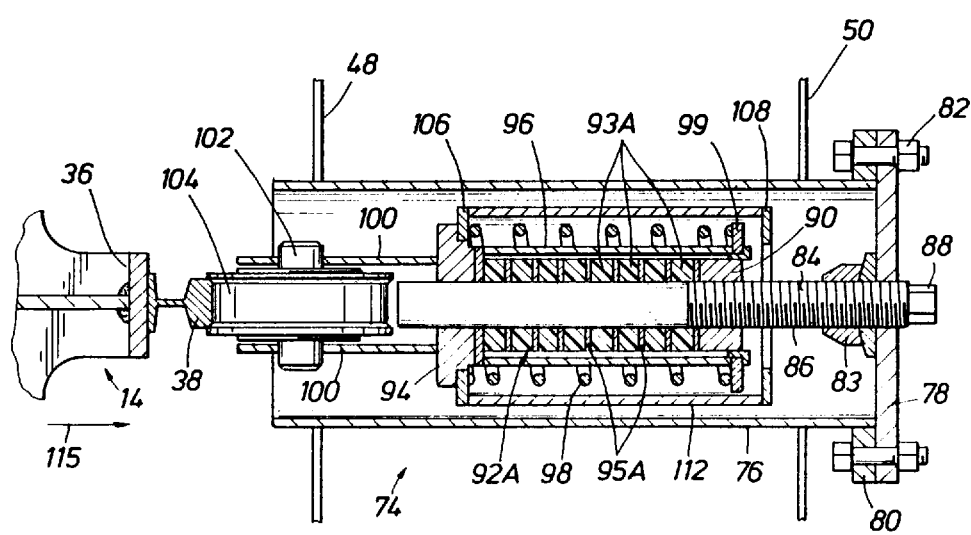
FIG. 8 is a longitudinal section of a modified spring arrangement showing an elastomer spring.

Referring to FIG. 8, a modified spring arrangement is shown in which an elastomer type spring 92A is used in lieu of the Belleville springs. Elastomer spring 92A includes a plurality of elastomeric pads 93A separated by a plurality of metal plates or discs 95A. Shaft 84 extends through elastomer spring 92A and spring 92A functions in a manner similar to Belleville springs 92 in the embodiments of FIGS. 1–7. Under certain conditions and for some turret bearing systems, elastomer springs 92A could be utilized without coil spring 98.

While preferred embodiments of the present invention have been illustrated in detail, it is apparent that modifications and adaptations of the preferred embodiments will occur to those skilled in the art. However, it is to be expressly understood that such modifications and adaptations are in the spirit and scope of the present invention as set forth in the following claims.

What is claimed is:

1. In a support structure carried by a vessel for supporting a substantially vertically aligned turret for rotation relative to said vessel, the turret having an outer annular rail secured about its outer circumference; a radial bearing assembly for said turret comprising:
    a roller in contact with said annular rail;
    a roller frame supporting said roller for rotation on an inner end and having a follower on an opposed outer end;
    a pair of spring assemblies mounted on said support structure radially outward of said follower and operatively connected to said follower for continuously urging said roller into contact with said rail;
    means mounting one of said spring assemblies for urging said follower and roller in a radial direction toward said rail less than the maximum radial movement of said roller; and
    means mounting the other of said spring assemblies for urging movement of said follower and roller in a radial direction toward said rail after full effective movement of said one spring assembly toward said rail thereby to maintain contact of said roller on said rail after said one spring assembly is ineffective.

2. In a support structure as set forth in claim 1 wherein said radial bearing assembly includes a shaft mounted on said support structure and having a spring abutment thereon; said one spring assembly comprises a plurality of inner spring elements mounted about said shaft and compressed between said follower and said spring abutment.

3. In a support structure as set forth in claim 2 wherein said inner spring elements comprise a plurality of elastomeric pads and a plurality of metal discs separating said elastomeric pads.

4. In a support structure as set forth in claim 2 wherein said inner spring elements comprise a plurality of Belleville springs.

5. In a support structure as set forth in claim 2 wherein said other spring assembly comprises a coil compression spring in outer concentric relation to said inner spring elements and connected to said follower for urging said roller into continuous contact with said rail.

6. In a support structure as set forth in claim 5 wherein an inner spring housing extends about said inner spring elements and an outer concentric spring housing extends about said coil compression spring.

7. In a support structure as set forth in claim 1 wherein said turret has an upper rail and a lower rail for reacting vertical loads, and said support structure has rollers for engaging said upper and lower rails for reacting said vertical loads.

8. A radial bearing arrangement for radially supporting a substantially vertically aligned turret rotatably carried by a vessel and comprising:
    an annular rail secured to the outer circumference of said turret;
    an outer annular turret support structure fixed to the vessel and extending in a concentric relation about said turret;
    a plurality of radial bearing assemblies mounted on said turret support structure and spaced at arcuate intervals about the outer circumference of said turret; each radial bearing assembly including:
    a roller frame having a roller thereon mounted for rotation, said roller being in bearing contact with said rail on said turret for radially supporting said turret; and
    continuous force exerting means mounting said roller frame and roller thereon for radial movement toward said rail to maintain continuous contact between said roller and said rail; said force exerting means continuously urging said roller into contact with said rail and comprising:
    a pair of spring assemblies mounted for independent axial movement and operatively connected to said roller frame for urging said roller into contact with said rail;
    means mounting one of said spring assemblies for movement with said roller frame and roller for a relatively short travel distance in a radial direction toward said rail; and
    means mounting the other of said spring assemblies for urging movement of said roller frame and roller in a radial direction toward said rail after full travel of said one spring assembly toward said rail thereby to maintain contact of said roller with said rail after said one spring assembly is ineffective.

9. A radial bearing arrangement as set forth in claim 8 wherein:
    said means mounting said one spring assembly includes a fixed shaft in radial alignment with said roller, and said one spring assembly comprises a plurality of Belleville springs mounted about said shaft and compressed by said roller frame upon outward radial movement of said roller.

10. A radial bearing arrangement as set forth in claim 8 wherein:
    said means mounting the other of said spring assemblies includes a coil compression spring in radial alignment with said roller and continuously urging said roller into contact with said rail on said turret throughout the entire radial travel path of said turret and roller.

11. A radial bearing arrangement as set forth in claim 8 wherein:

a bearing support structure is mounted on said vessel including inner and outer concentric rings, and a generally cylindrical outer housing is secured to said rings; said continuous force exerting means mounted within said outer housing.

12. A radial bearing arrangement as set forth in claim 11 wherein:

a shaft is secured within said outer housing in radial alignment with said roller; and said force exerting means includes a pair of concentric spring assemblies mounted about said shaft and continuously urging said roller frame and roller in an inward radial direction for engaging said rail.

13. A radial bearing arrangement as set forth in claim 12 wherein:

one of said spring assemblies includes a plurality of Belleville springs mounted about said shaft and compressed by said roller frame upon outward radial movement of said roller; and the other of said spring assemblies includes a coil compression spring in radial alignment with said roller and continuously urging said roller frame and roller radially toward said rail throughout the entire radial travel path of said turret and roller.

14. A radial bearing arrangement as set forth in claim 13 wherein:

said roller frame comprises a pair of spaced arms supporting said roller for rotation, and a follower connected to said arms is mounted about said shaft, said spring assemblies acting against said follower for urging said follower and roller radially toward said rail.

15. In a support structure carried by a vessel for supporting a substantially vertically aligned turret for rotation relative to said vessel, the turret having an outer annular rail secured about its outer circumference; a radial bearing assembly for said turret comprising:

a roller in contact with said annular rail;

a roller frame supporting said roller for rotation on an inner end and having a follower on an opposed outer end;

a shaft having an inner end received with said follower for relative axial movement and an outer end having a spring abutment thereon;

an elastomer spring mounted about said shaft and positioned between said follower and spring abutment for urging said follower and roller in a radial direction toward said rail; and a coil compression spring mounted in concentric relation to said elastomeric spring, said coil compression spring being operatively connected to said follower for urging said roller into contact with said rail.

16. In a support structure as set forth in claim 15 wherein said elastomer spring includes a plurality of elastomeric pads and a plurality of metal discs separating said elastomeric pads.

\* \* \* \* \*